United States Patent
Xu

(10) Patent No.: US 10,400,674 B2
(45) Date of Patent: Sep. 3, 2019

(54) COOLED FUEL INJECTOR SYSTEM FOR A GAS TURBINE ENGINE AND METHOD FOR OPERATING THE SAME

(71) Applicant: United Technologies Corporation, Hartford, CT (US)

(72) Inventor: JinQuan Xu, East Greenwich, RI (US)

(73) Assignee: United Technologies Corporation, Farmington, CT (US)

(*) Notice: Subject to any disclaimer, the term of this patent is extended or adjusted under 35 U.S.C. 154(b) by 515 days.

(21) Appl. No.: 14/707,790

(22) Filed: May 8, 2015

(65) Prior Publication Data
US 2015/0323186 A1  Nov. 12, 2015

Related U.S. Application Data

(60) Provisional application No. 61/991,086, filed on May 9, 2014.

(51) Int. Cl.
| | |
|---|---|
| *F02C 7/18* | (2006.01) |
| *F23R 3/28* | (2006.01) |
| *F02C 6/08* | (2006.01) |
| *F02C 7/224* | (2006.01) |

(52) U.S. Cl.
CPC .......... *F02C 7/18* (2013.01); *F02C 6/08* (2013.01); *F02C 7/224* (2013.01); *F23R 3/283* (2013.01); *F05D 2260/204* (2013.01); *F05D 2260/213* (2013.01); *Y02T 50/676* (2013.01)

(58) Field of Classification Search
CPC ...... F02C 6/08; F02C 7/16; F02C 7/18; F02C 7/185; F02C 7/14; F02C 7/224; F05D 2260/204; F05D 2260/213; F05D 2260/2214; F05D 2260/232; F23R 3/002; F23R 3/283; F23R 2900/03043; F23R 2900/03045; F23R 3/34; F23R 3/346; F23D 11/36; F23D 14/78; F23D 2214/00; F01D 25/12
See application file for complete search history.

(56) References Cited

U.S. PATENT DOCUMENTS 3,600,890 A    8/1971  White
4,120,150 A *  10/1978 Wakeman ............... F02C 7/185
                                                       60/39.091

(Continued)

FOREIGN PATENT DOCUMENTS

WO    2014/105108    7/2014
WO    2014/105109    7/2014

(Continued)

*Primary Examiner* — Andrew H Nguyen
(74) *Attorney, Agent, or Firm* — O'Shea Getz P.C.

(57) ABSTRACT

A cooled fuel injector system of a combustor section of a gas turbine engine is provided. At least a part of the fuel injector system is exposed to core gas flow traveling through the engine. The cooled fuel injector system includes a source of a first cooling fluid and a fuel injector system component. The first cooling fluid is at a temperature lower than a temperature of the core gas flow proximate the fuel injector system. The fuel injector system component includes a vascular engineered structure lattice (VESL) structure, which VESL structure is in fluid communication with the source of the cooling fluid.

18 Claims, 11 Drawing Sheets

(56) References Cited

U.S. PATENT DOCUMENTS

| | | | |
|---|---|---|---|
| 4,901,520 A * | 2/1990 | Kozak | F02C 6/08 |
| | | | 415/115 |
| 5,577,386 A * | 11/1996 | Alary | F23D 11/36 |
| | | | 239/132.5 |
| 6,415,595 B1 * | 7/2002 | Wilmot, Jr. | B64D 13/006 |
| | | | 60/266 |
| 6,546,732 B1 | 4/2003 | Young | |
| 6,932,093 B2 | 8/2005 | Ogden | |
| 7,654,091 B2 | 2/2010 | Al-Roub | |
| 7,997,057 B1 | 8/2011 | Harris | |
| 8,196,407 B2 | 6/2012 | Harris | |
| 8,281,594 B2 | 10/2012 | Wiebe | |
| 2010/0071667 A1 * | 3/2010 | Hicks | F02C 3/30 |
| | | | 123/470 |
| 2010/0287942 A1 * | 11/2010 | Zuo | F23R 3/286 |
| | | | 60/772 |
| 2011/0289928 A1 * | 12/2011 | Fox | F23R 3/286 |
| | | | 60/740 |
| 2013/0174568 A1 * | 7/2013 | Uhm | F23R 3/283 |
| | | | 60/776 |
| 2014/0033728 A1 * | 2/2014 | Marmilic | F02C 7/141 |
| | | | 60/772 |
| 2015/0204244 A1 | 7/2015 | Williams | |
| 2015/0218963 A1 | 8/2015 | Alecu | |
| 2015/0345298 A1 * | 12/2015 | Mongillo | F01D 5/187 |
| | | | 60/755 |
| 2015/0345396 A1 * | 12/2015 | Zelesky | F01D 5/187 |
| | | | 60/806 |

FOREIGN PATENT DOCUMENTS

| | | |
|---|---|---|
| WO | 2014/105113 | 7/2014 |
| WO | 2015/023863 | 2/2015 |

* cited by examiner

COOLED FUEL INJECTOR SYSTEM FOR A GAS TURBINE ENGINE AND METHOD FOR OPERATING THE SAME

This application claims priority to U.S. Patent Appln. No. 61/991,086 filed May 9, 2014.

BACKGROUND OF THE INVENTION

1. Technical Field

The present disclosure relates to a gas turbine engine and, more particularly, to a fuel injector system therefor and method of operation.

2. Background Information

Gas turbine engines, such as those that power modern commercial and military aircraft, include a compressor section to pressurize a supply of air, a combustor section to burn a hydrocarbon fuel in the presence of the pressurized air, and a turbine section to extract energy from the resultant combustion gases and generate thrust.

The combustor section generally includes a plurality of circumferentially distributed fuel injectors that axially project into a combustion chamber to supply fuel to be mixed with the pressurized air. Gas turbine engines typically include a plurality of individually controlled centralized staging valves in combination with one or more fuel supply manifolds that deliver fuel to the fuel injectors.

Each fuel injector typically has an inlet fitting connected to the manifold at the base, a conduit or stem connected to the base fitting, and a nozzle tip assembly connected to the conduit or stem to spray the fuel into the combustion chamber. Appropriate valves and/or flow dividers are provided to direct and control the flow of fuel through the nozzle assembly.

The nozzle assembly often includes pilot and main nozzles. Generally, the main nozzles are for normal and high power situations, while the pilot nozzles are used for start operation. The nozzles have relatively small openings and fuel passages in the conduit that may be prone to coke formation due to high fuel temperature. Coke formation may result in narrowed fuel openings, uneven fuel burn and increased maintenance requirements. Further, coke formation may form in the fuel conduit of the fuel injector, break off in fragments and ultimately obstruct fuel injector nozzle tip openings.

Conventional fuel injector designs typically utilize heat shields around the fuel injector conduit to provide an insulated, static, air gap and reduce the heat transfer rate within the diffuser case module to the fuel.

SUMMARY

According to one aspect of the present disclosure, a cooled fuel injector system of a combustor section of a gas turbine engine is provided. At least a part of the fuel injector system is exposed to core gas flow traveling through the engine. The cooled fuel injector system includes a source of a first cooling fluid and a fuel injector system component. The first cooling fluid is at a temperature lower than a temperature of the core gas flow proximate the fuel injector system. The fuel injector system component includes a vascular engineered structure lattice (VESL) structure, which VESL structure is in fluid communication with the source of the first cooling fluid.

In a further embodiment of the foregoing embodiment, the first cooling fluid includes hydrocarbon fuel of the same type injected into a combustion chamber of the combustor section through the fuel injector system.

In a further embodiment of any of the foregoing embodiments of the present disclosure, the fuel injector system is configured to pass the hydrocarbon fuel first cooling fluid into the combustion chamber after the first cooling fluid has passed through the VESL structure.

In a further embodiment of any of the foregoing embodiments of the present disclosure, the fuel injector system is configured such that the hydrocarbon fuel first cooling fluid passes through the VESL structure and subsequently away from the combustion chamber.

In a further embodiment of any of the foregoing embodiments of the present disclosure, the cooling system further includes a heat exchanger configured to receive compressor bleed air, cool the same, and pass the cooled bleed air through the VESL structure as the first cooling fluid.

In a further embodiment of any of the foregoing embodiments of the present disclosure, the VESL structure includes a plurality of branches and nodes, each of which branch extends outwardly from a node, and branches connect nodes within the VESL structure.

In a further embodiment of any of the foregoing embodiments of the present disclosure, the VESL structure is disposed between walls of the fuel injector system component, and the VESL structure is surrounded by voids configured for passage of the first cooling fluid around and over the nodes and branches of the VESL structure.

In a further embodiment of any of the foregoing embodiments of the present disclosure, the VESL structure is a solid structure.

In a further embodiment of any of the foregoing embodiments of the present disclosure, the VESL structure is a hollow vascular structure in which the first cooling fluid is communicated inside hollow passages of one or more nodes and branches of the VESL structure.

In a further embodiment of any of the foregoing embodiments of the present disclosure, the system further includes a source of a second cooling fluid, which second cooling fluid is at a temperature lower than a temperature of the core gas flow proximate the fuel injector system. The VESL structure is disposed between walls of the fuel injector system component, and the VESL structure is surrounded by voids configured for passage of the second cooling fluid around and over the nodes and branches of the VESL structure.

In a further embodiment of any of the foregoing embodiments of the present disclosure, one of the first cooling fluid or second cooling fluid is a hydrocarbon fuel of the same type injected into a combustion chamber of the combustor section through the fuel injector system, and the other of the first cooling fluid or the second cooling fluid is a cooled compressor bleed air.

In a further embodiment of any of the foregoing embodiments of the present disclosure, the VESL structure is disposed in a portion of the fuel injector system component that is exposed to core gas flow during operation of the gas turbine engine.

According to another aspect of the present disclosure, a combustor section of a gas turbine engine is provided. The engine has a core gas flow traveling axially through the engine. The combustor section includes a forward fuel injector system and a downstream fuel injector system. The downstream fuel injector system includes at least one component having a vascular engineered structure lattice (VESL) structure. The VESL structure is in fluid communication with a source of a first cooling fluid. The source of the first cooling fluid selectively provides the first cooling fluid to the component at a temperature lower than a temperature of the core gas flow proximate the component of the downstream fuel injector system.

In a further embodiment of any of the foregoing embodiments of the present disclosure, the first cooling fluid is a hydrocarbon fuel, and the downstream fuel injector system is configured to pass the hydrocarbon fuel first cooling fluid into the combustion chamber after the first cooling fluid has passed through the VESL structure.

In a further embodiment of any of the foregoing embodiments of the present disclosure, the combustor section further includes a heat exchanger configured to receive compressor bleed air, cool the same, and pass the cooled bleed air through the VESL structure as the first cooling fluid.

In a further embodiment of any of the foregoing embodiments of the present disclosure, the VESL structure includes a plurality of branches and nodes, each of which branch extends outwardly from a node, and branches connect nodes within the VESL structure.

In a further embodiment of any of the foregoing embodiments of the present disclosure, the VESL structure is a hollow vascular structure in which the first cooling fluid is communicated inside hollow passages of one or more nodes and branches of the VESL structure.

In a further embodiment of any of the foregoing embodiments of the present disclosure, the downstream fuel injector system further includes a source of a second cooling fluid, which second cooling fluid is at a temperature lower than a temperature of the core gas flow proximate the downstream fuel injector system. The VESL structure is disposed between walls of the downstream fuel injector system component, and the VESL structure is surrounded by voids configured for passage of the second cooling fluid around and over the nodes and branches of the VESL structure.

In a further embodiment of any of the foregoing embodiments of the present disclosure, one of the first cooling fluid or second cooling fluid is a hydrocarbon fuel of the same type injected into a combustion chamber of the combustor section through the downstream fuel injector system, and the other of the first cooling fluid or the second cooling fluid is a cooled compressor bleed air.

According to another aspect of the present disclosure, a gas turbine engine is provided. The engine has an axially traveling core gas flow. The engine includes a compressor, a combustor section, and a turbine section. The combustor section includes a forward fuel injector system, a downstream fuel injector system, and a combustion chamber. Both fuel injection systems are in communication with the combustion chamber. The downstream fuel injector system includes at least one component having a vascular engineered structure lattice (VESL) structure. The VESL structure is in fluid communication with a source of a first cooling fluid. The source of the first cooling fluid selectively provides the first cooling fluid to the component at a temperature lower than a temperature of the core gas flow proximate the component of the downstream fuel injector system.

According to another aspect of the present disclosure, a method of cooling a combustor section of a gas turbine engine is provided. The engine has a core gas flow traveling axially through the engine. The method includes the steps of: a) providing a combustor section having a forward fuel injector system, a downstream fuel injector system, and a combustion chamber with which both fuel injection systems are in communication; b) providing at least one vascular engineered structure lattice (VESL) structure disposed in at least one component in the downstream fuel injector system; c) providing fluid communication between the VESL structure and a source of a first cooling fluid, which first cooling fluid is at a temperature lower than a temperature of the core gas flow proximate the component of the downstream fuel injector system; and d) selectively passing the first cooling fluid through the VESL structure within the component.

In a further embodiment of any of the foregoing embodiments of the present disclosure, the first cooling fluid is a hydrocarbon fuel, and the method further comprises passing the hydrocarbon fuel first cooling fluid into the combustion chamber after the first cooling fluid has passed through the VESL structure.

In a further embodiment of any of the foregoing embodiments of the present disclosure, the VESL structure includes a plurality of branches and nodes, each of which branch extends outwardly from a node, and branches connect nodes within the VESL structure.

In a further embodiment of any of the foregoing embodiments of the present disclosure, the VESL structure is a hollow vascular structure and the step of selectively passing the first cooling fluid includes passing the first cooling fluid through hollow passages of one or more nodes and branches of the VESL structure.

A further embodiment of any of the foregoing embodiments of the present disclosure includes the step of providing a source of a second cooling fluid, which second cooling fluid is at a temperature lower than a temperature of the core gas flow proximate the downstream fuel injector system. The VESL structure is disposed between walls of the downstream fuel injector system component, and the VESL structure is surrounded by voids configured for passage of the second cooling fluid around and over the nodes and branches of the VESL structure. The method may also include the step of selectively passing the second cooling fluid through the voids surrounding the VESL structure and around and over the nodes and branches of the VESL structure.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
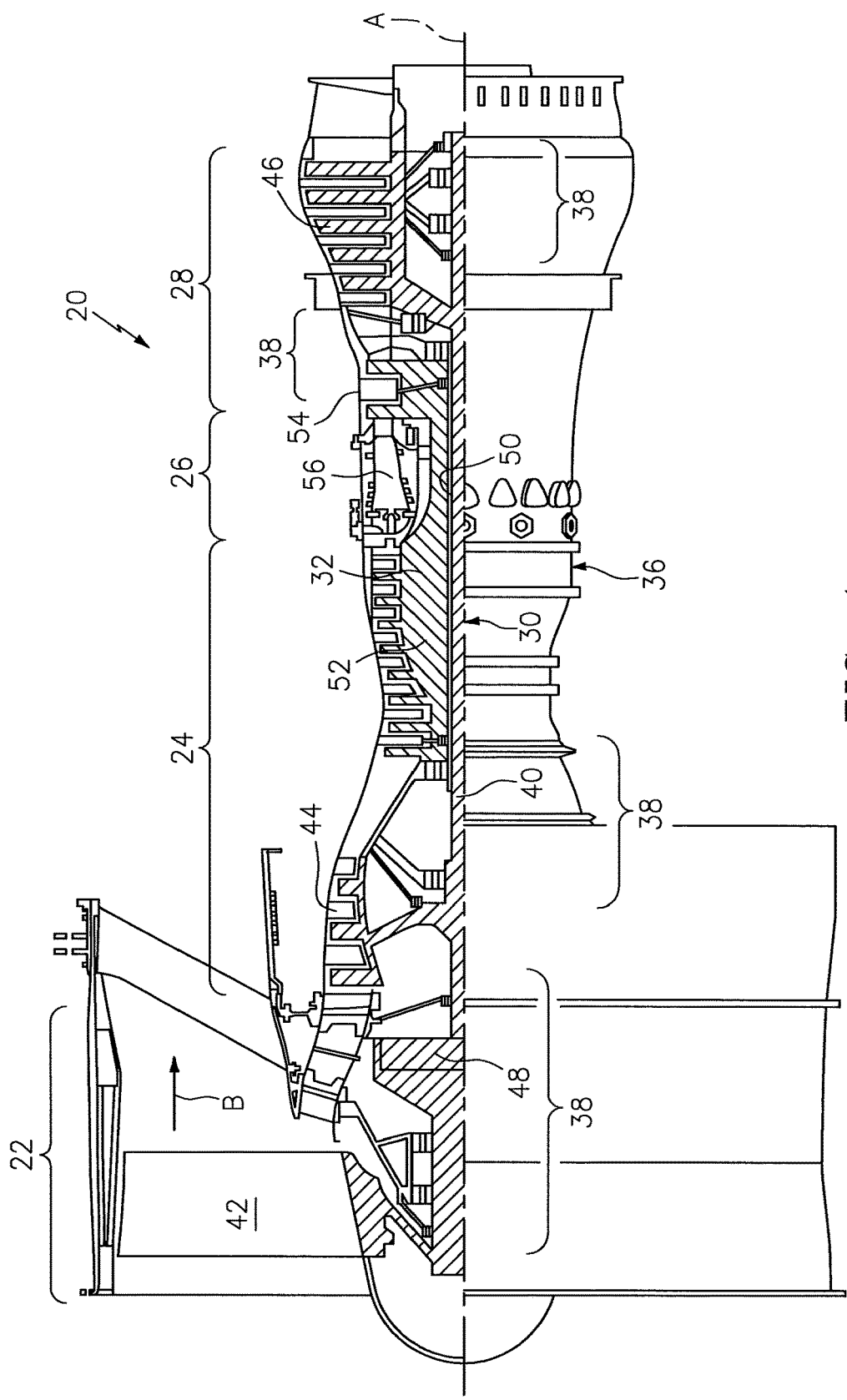
FIG. 1 is a diagrammatic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core gas path for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis "A" relative to an engine static structure 36 or engine case via several bearing structures 38. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") of the compressor section 24 and high pressure turbine 54 ("HPT") of the turbine section 28. A combustor 56 of the combustor section 26 is arranged between the high pressure compressor 52 and the high pressure turbine 54. The inner shaft 40 and the outer shaft 50 are concentric and rotate about the engine central longitudinal axis "A" which is collinear with their longitudinal axes.

Core gas flow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass airflow along path "B" due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $("T"/518.7)^{0.5}$ in which "T" represents the ambient temperature in degrees Rankine. The Low Corrected Fan Tip Speed according to one non-limiting embodiment of the example gas turbine engine 20 is less than about 1150 fps (351 mls).

Figure 2:
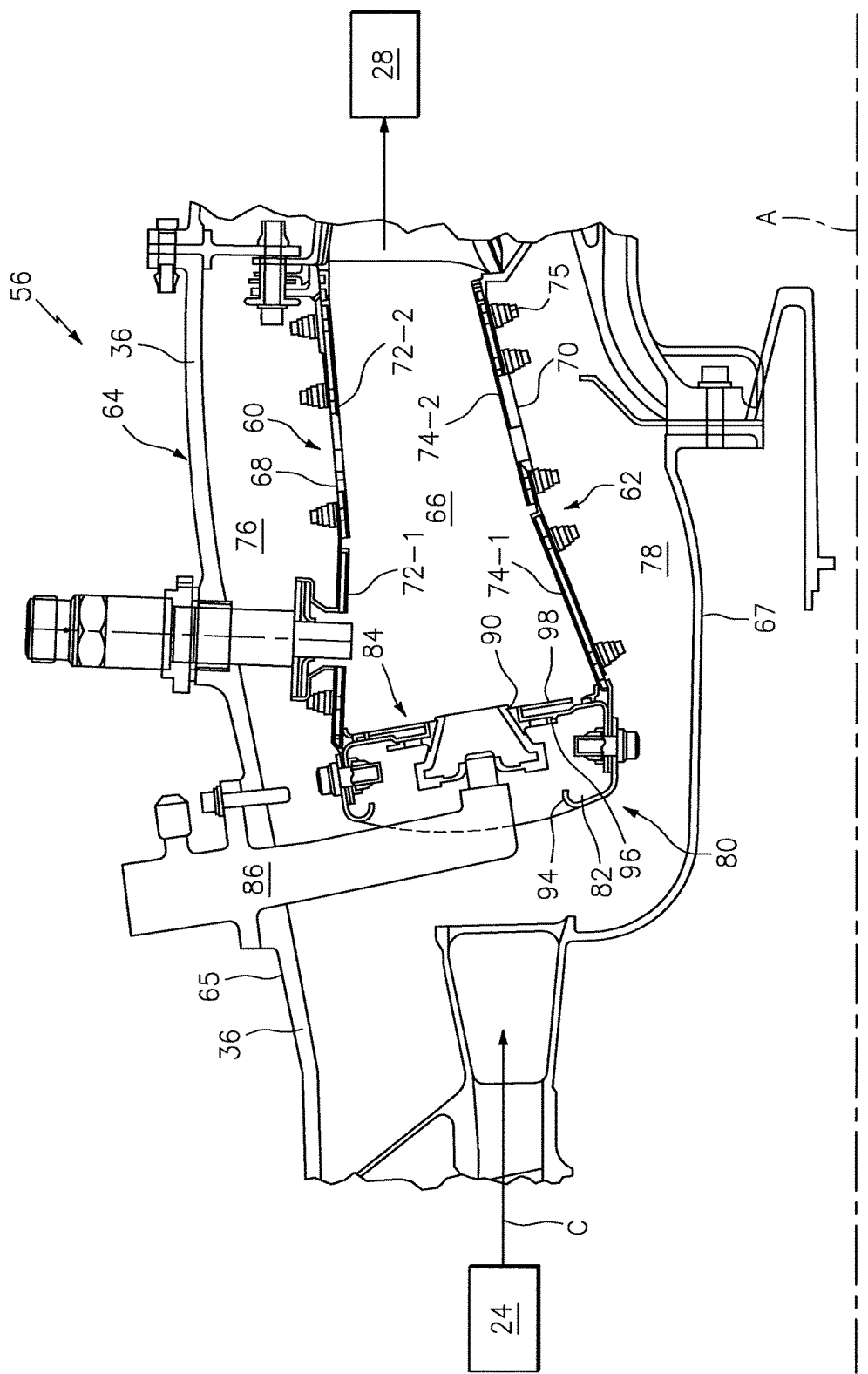
FIG. 2 is a partial longitudinal diagrammatic cross-section of a combustor section according to one non-limiting embodiment that may be used with the gas turbine engine shown in FIG. 1.

With reference to FIG. 2, the combustor 56 may be annular and generally includes an outer wall 60, an inner wall 62 and a diffuser case module 64. The outer wall 60 and the inner wall 62 are spaced apart radially with respect to axis "A" and such that a combustion chamber 66 is generally defined there between. The combustion chamber 66 is generally annular in shape. The outer wall 60 is spaced radially inward from a diffuser outer case 65 of the diffuser case module 64, with an annular outer plenum 76 being defined there between. The inner wall 62 is spaced radially outward from a diffuser inner case 67 of the diffuser case module 64 to define an annular inner plenum 78. It should be understood that although a particular combustor is illustrated, other combustor types with various combustor wall and case arrangements will also benefit here from. For instance, the diffuser outer case 65 maybe an integral part of the engine case structure 36.

Each combustor wall 60, 62 generally includes a respective support shell 68, 70 that supports one or more liners 72, 74 mounted to a hot side of the respective support shell 68, 70. The liners 72, 74 directly define the combustion chamber 66 that contains the flow of combustion products for driving the turbine section 28. The liners 72, 74 maybe comprised of a plurality of Impingement Film Float (IFF) panels orientated in a generally rectilinear liner array. Each panel may be manufactured of, for example, a nickel based super alloy, ceramic or other temperature resistant material. In one disclosed non-limiting embodiment, the array includes a plurality of forward liner panels 72-1 and a plurality of aft liner panels 72-2 that line the hot side of the outer shell 68 and a plurality of forward liner panels 74-1 and a plurality of aft liner panels 74-2 that line the hot side of the inner shell 70.

The combustor 56 also includes a forward assembly 80 immediately downstream of the compressor section 24 to guide compressed airflow C therefrom. The forward assembly 80 generally includes an annular hood 82, a bulkhead assembly 84 and a plurality of swirlers 90 (one shown) spaced circumferentially about engine axis "A".

The annular hood 82 extends radially between, and in this disclosed non-limiting embodiment, is secured to, the forward most ends of the walls 60, 62. The plurality of circumferentially distributed hood ports 94 accommodate a respective plurality of fuel injectors 86 as well as direct compressed air C into the forward end of the combustion chamber 66 through the associated swirler 90. Each fuel injector 86 may be secured to the diffuser case module 64 to project through one of the hood ports 94 and the respective swirler 90. It should be appreciated that various architectures of the forward assembly 80 will also benefit here from.

Each swirler 90 in this disclosed non-limiting embodiment is circumferentially aligned with its respective hood port 94 to project through the bulkhead assembly 84. The bulkhead assembly 84 includes a bulkhead support shell 96 secured to the walls 60, 62, and a plurality of circumferentially distributed bulkhead heat shields 98 secured to the bulkhead support shell 96 around each swirler 90.

The forward assembly 80 and walls 60, 62 introduce core combustion air into the forward end of the combustion chamber 66 while the remainder enters from the annular outer plenum 76 and the annular inner plenum 78. The plurality of fuel injectors 86 and respective swirlers 90 facilitate the generation of a blended fuel-air mixture that supports combustion in the combustion chamber 66.

Figure 3:
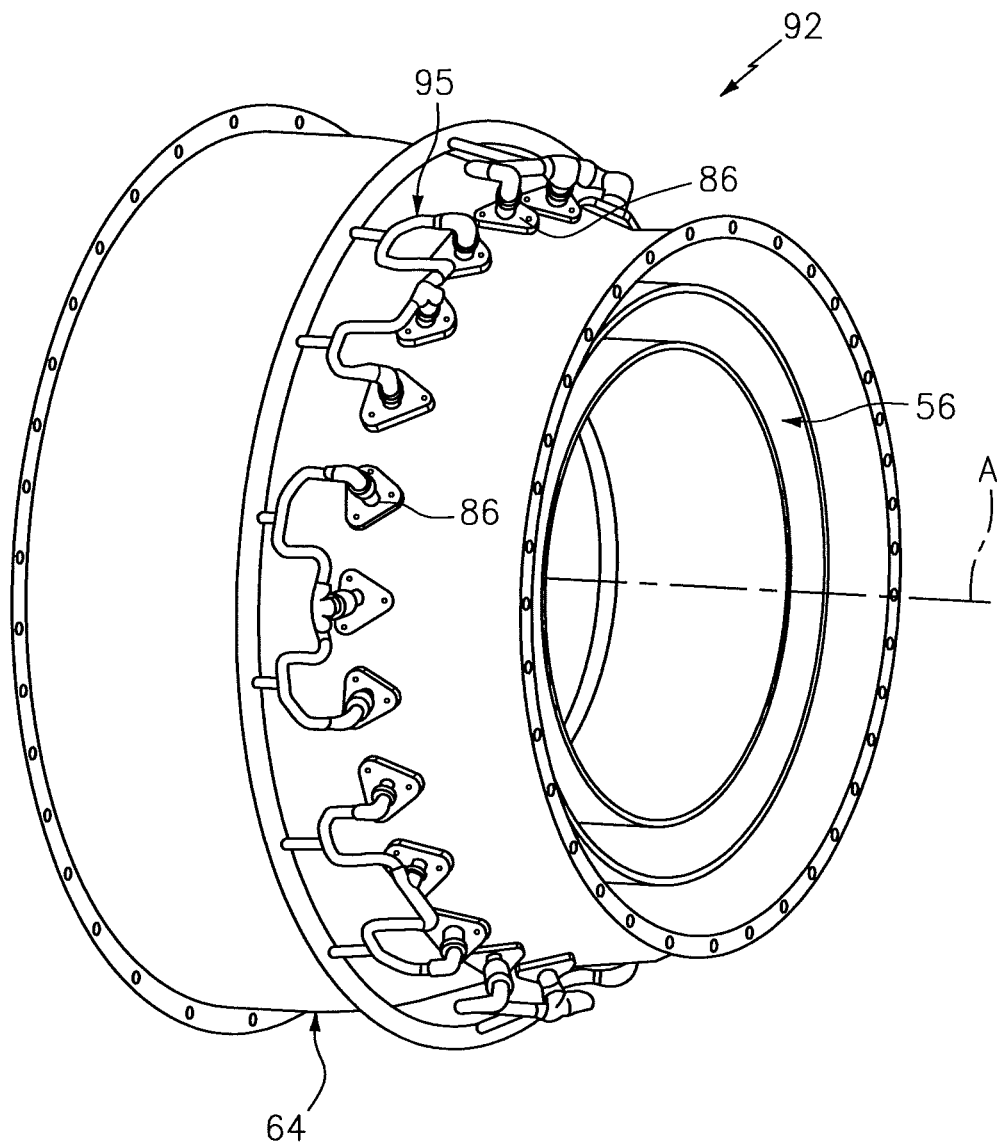
FIG. 3 is a perspective diagrammatic isometric view of a diffuser case module that further illustrates a fuel manifold of a fuel injector system.

With reference to FIG. 3, a fuel injector system 92 (referred to below as the "forward fuel injector system 92") generally includes one or more fuel injector supply manifolds 95 (one shown) for distributing fuel to the plurality of fuel injectors 86. The fuel injector supply manifolds 95 are generally ring shaped and arranged circumferentially around the diffuser case module 64 to communicate fuel to the plurality of fuel injectors 86 that project radially inward and into the annular combustor 56. It should be appreciated that various fuel injector systems and geometries will benefit here from.

Figure 4:
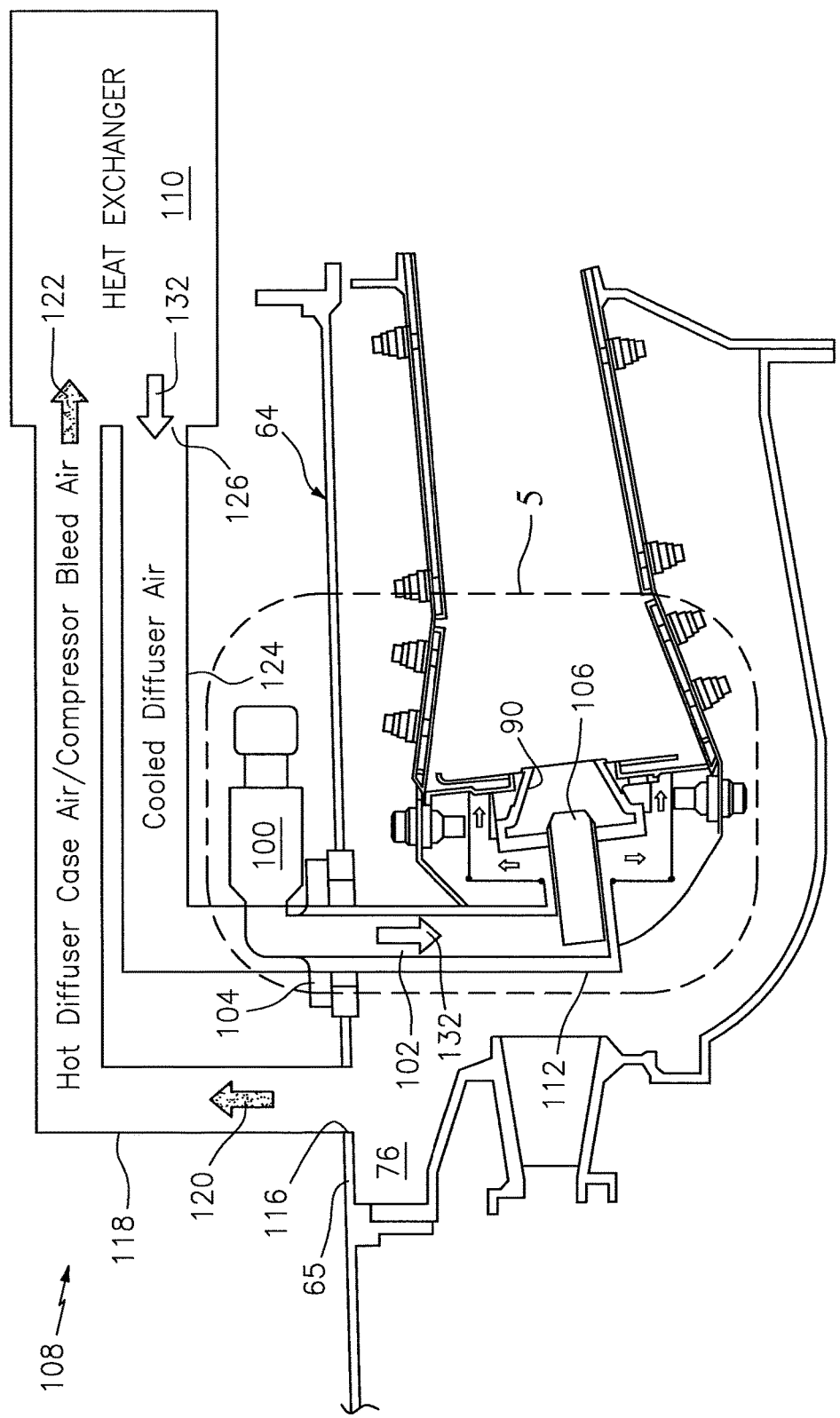
FIG. 4 is a diagrammatic cross section of the combustor section according to one disclosed non-limiting embodiment.
Figure 5:
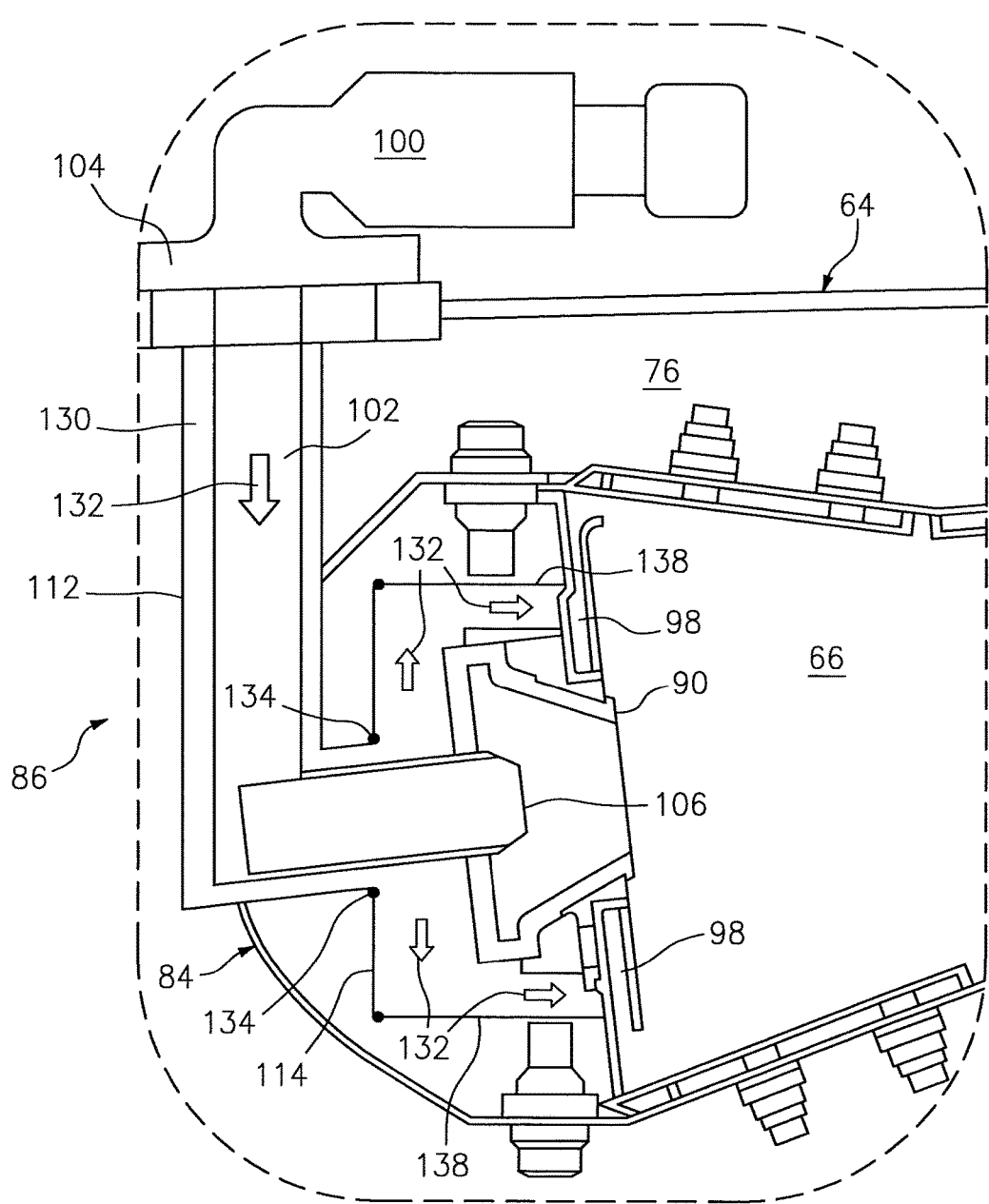
FIG. 5 is an enlarged partial diagrammatic cross section of the combustor section of FIG. 4 taken from circle 5.
Figure 6:
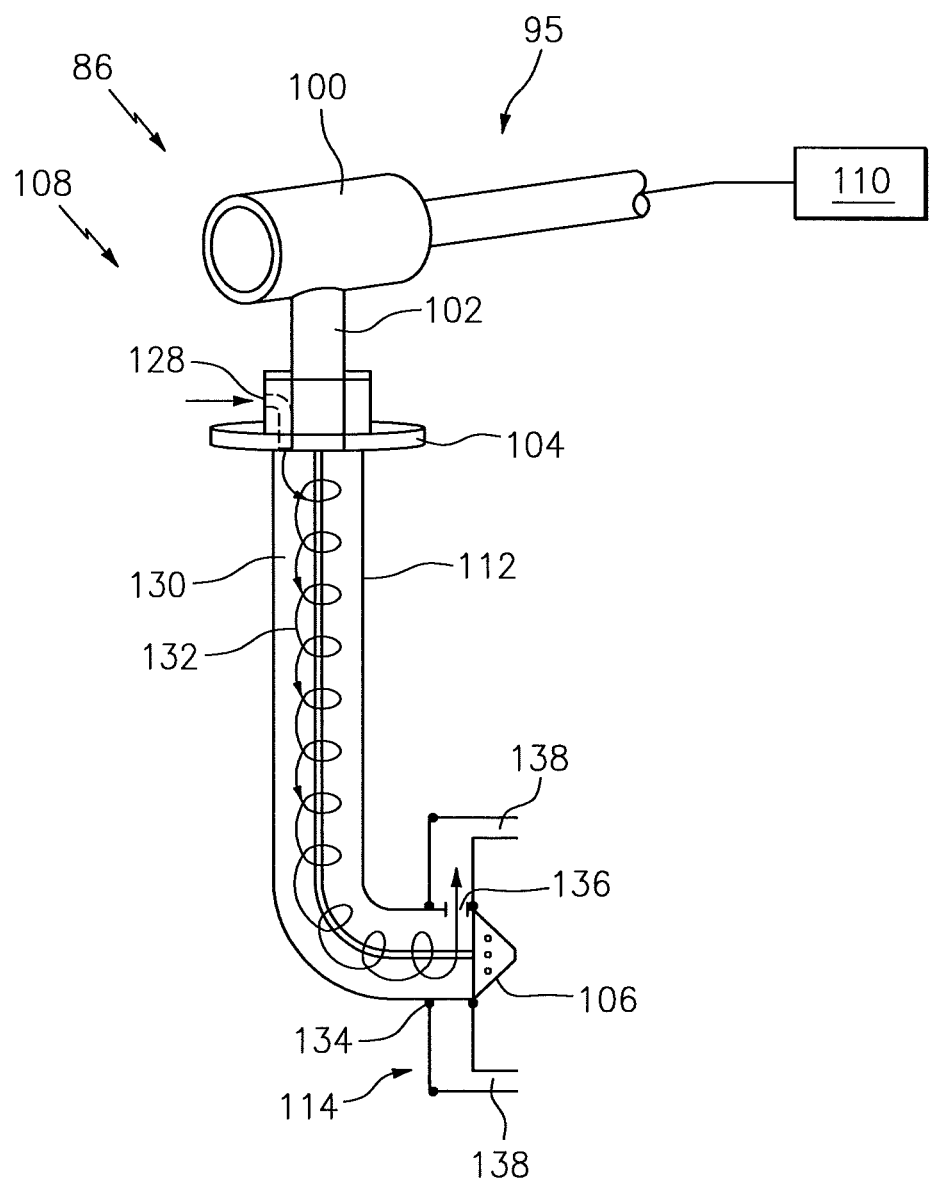
FIG. 6 is diagrammatic view of a fuel injector of the combustor section.

With reference to FIGS. 4 to 6, each of the plurality of fuel injectors 86 generally includes a valve 100, a fuel conduit 102, a support 104, and a nozzle tip 106. The valve 100 may be located radially outward from the diffuser case module 64 and proximate to the support 104 engaged to the diffuser outer case 65 of module 64 or engine case 36. The fuel conduit 102 is supported by and extends through support 104 and spans between the fuel manifold 95 and nozzle tip 106 for flowing fuel from the manifold and through the nozzle tip 106. The valve 100 is operatively mounted to the conduit 102 upstream of the support 104 and may operate to selectively control fuel communication into one or more fuel circuits such as primary and secondary, within each of the plurality of fuel injectors 86 for direction through the nozzle tip 106. The nozzle tip 106 operates to spray the fuel into the combustor chamber 66 through the swirler 90.

A fuel injector cooling system 108 generally has a heat exchanger 110, a sleeve 112, and a flow distribution apparatus 114. The heat exchanger 110 may be located radially outward of the diffuser case module 64. A port 116 in the outer case 65 may be in direct communication between the outer plenum 76 of the diffuser case module 64 and a supply passage 118 to flow a portion of hot diffuser case air 120 to an inlet 122 of heat exchanger 110. A second or outlet passage 124 may communicate between a heat exchanger outlet 126 and an opening 128 defined by and communicating through the fuel injector support 104 (see FIG. 6). The sleeve 112 is generally concentric to and extends co-axially with the injector conduit 102, and may be engaged to and supported by the support 104. The opening 128 communicates with an annular channel 130 defined annularly between the sleeve 112 and the injector conduit 102. Cooled diffuser case air 132 is expelled from the heat exchanger 110 through the outlet 126, into the second passage 124, through the opening 128 and into the sleeve 112. Although illustrated as a relatively small orifice, the actual size of opening 128 is dictated upon the desired reduction of fuel heat-up rate in the injector conduit 102. Opening 128 in support 104 may thus be much larger while the sleeve 112 remains supported, at least in part, by support 104.

In operation, the sleeve 112 and the cooling or blanketing flow therein protect the fuel conduit 102 from the high temperatures within the diffuser case plenum that can be about or exceed 1100 F (621 C). This protection or temperature buffering by the cooling system 108 minimizes the heat-up rate of fuel flowing through the injector conduit 102 and thus minimizes coking. More specifically, the air 132 thermally interacts with the fuel conduit 102 within the sleeve 112 to manage the fuel conduit 102 wetted wall temperatures to within acceptable limits (i.e. less than 400 F) and thereby minimize—if not prevent—fuel coke deposition and resultant performance degradation of the combustor 56 along the length of the sleeve 112 to the nozzle tip 106. In one example, the acceptable wetted wall limits are about 350 F (177 C). It should be appreciated that the cooled diffuser case air 132 may be hotter than the desired fuel temperature in the conduit and may actually heat the fuel. However, because the cooled diffuser case air 132 is less than the hot diffuser case air 120 that the fuel injector conduit 102 would otherwise be exposed to, the fuel heat-up rate is reduced. It should be appreciated that various cooling fluid circuit geometries and flow directions such as, but not limited to, helical (see FIG. 6), may be utilized within the sleeve 112. The sleeve 112, and structures creating flow geometries therein, may be readily manufactured, for example, via an additive manufacturing process such as powder bed metallurgy, direct metal laser sintering, electron beam melting or other.

Figure 7:
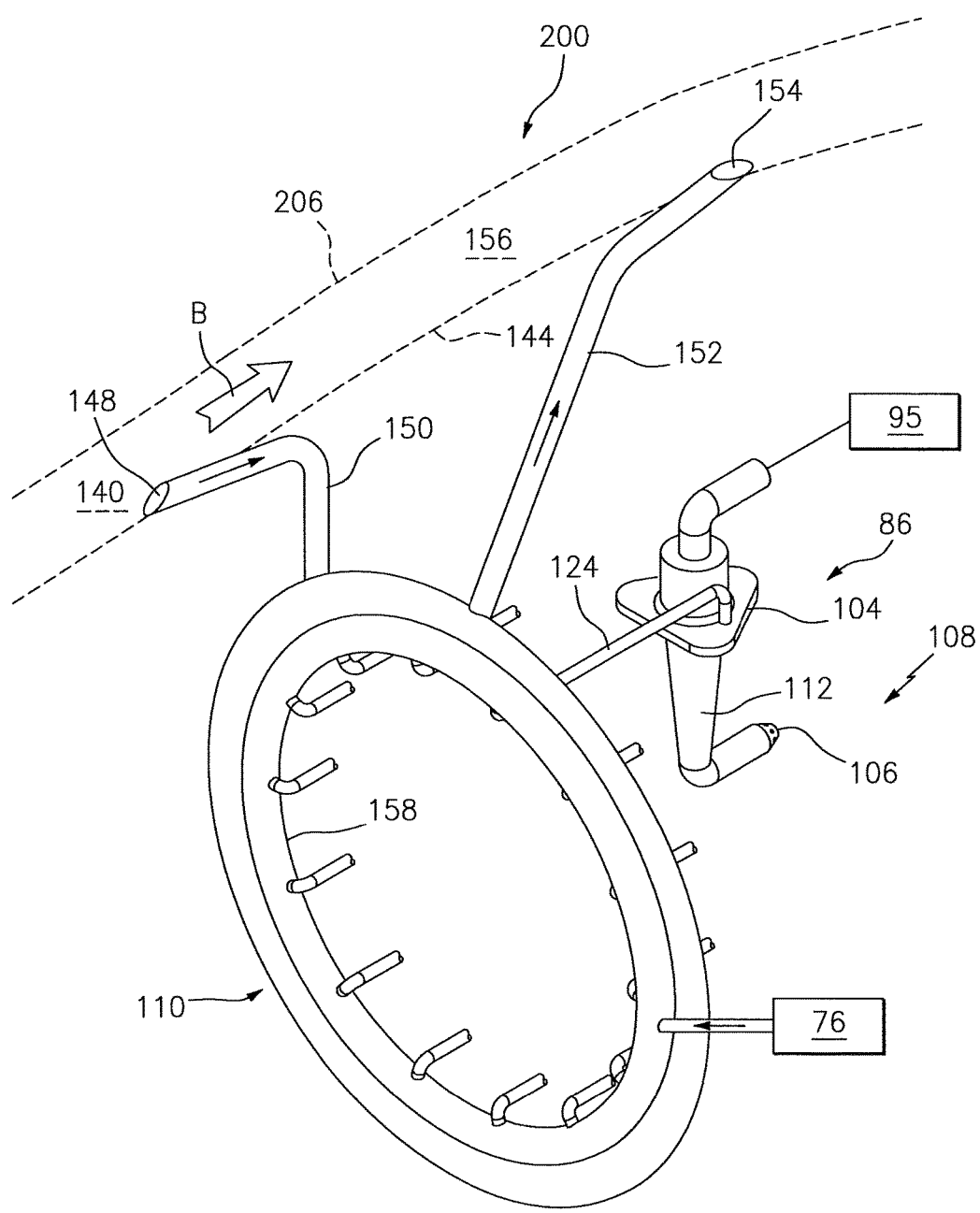
FIG. 7 is partial perspective diagrammatic view of a cooling system for use with the fuel injector system according to one disclosed non-limiting embodiment.

Referring to FIGS. 5 to 7, the flow distribution apparatus 114 is engaged to a distal end of the sleeve 112 and proximate to the nozzle tip 106 of the fuel injector 86. This engagement may be through an expansion joint 134 of the apparatus to account for thermal transients in the bulkhead assembly 84. From the sleeve 112, the cooled diffuser case air 132 flows through at least one outlet 136 in the sleeve and into the flow distribution apparatus 114. Apparatus 114 may expel this cooling air near or at the heat shields 98 of the bulkhead assembly 84 for a type of secondary cooling of the shields. Apparatus 114 may also be constructed and arranged to permit the typical flow of hot diffuser case air 120 from the bulkhead assembly 84 (or chamber defined therein), through the swirlers 90 and into the combustion chamber 66 for mixing and combustion with the fuel spray.

One such construction may be the use of individual tubes 138 of apparatus 114 that are circumferentially spaced and may fan radially outward from the sleeve 112 and thereby direct flow to the heat shields 98 for further cooling. In such an array each tube 138 may communicate with a respective outlet 136 in the sleeve 112. It is understood, however, that other apparatus arrangements are possible that direct cooling to the heat shields while not obstructing flow to the swirlers. For instance, an annular plenum structure may project radially outward from the sleeve 112 wherein the plenum receives cooling air 132 through a single outlet 136 and then distributes the air to the tubes 138. Furthermore, it is also understood that this secondary cooling need not be directed to the heat shields but can be routed by the apparatus to cool various components of the turbine section 28.

Figure 8:
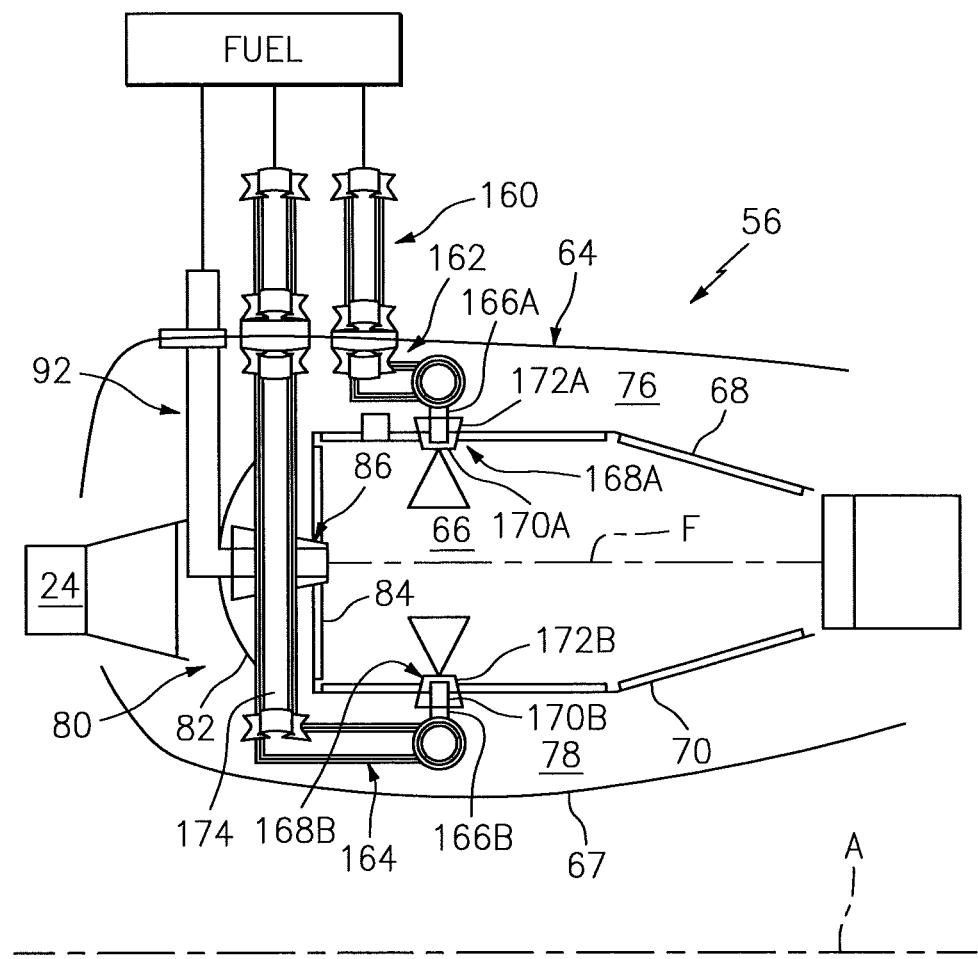
FIG. 8 is diagrammatic cross-sectional view of a combustor section according to one non-limiting embodiment that may be used with the gas turbine engine shown in FIG. 1.

Referring to FIGS. 7 and 8, the heat exchanger 110 of the cooling system 108 may establish a cooling medium by utilizing bypass airflow "B" from within a bypass flowpath 140 of a nacelle assembly 142. The nacelle assembly 142 generally includes a core nacelle 144 at least partially surrounded by a fan nacelle 146 to define the generally annular bypass flowpath 140.

The cooling medium configuration generally includes an inlet scoop 148, an inlet passage 150, an exhaust passage 152 and an exhaust outlet 154. The inlet scoop 148 is located through the core nacelle 144 axially upstream of a throat region 156 between the core nacelle 144 and the fan nacelle 146 to direct a portion of the bypass airflow into the inlet scoop 148 (see FIG. 7). The portion of bypass airflow B from the inlet scoop 148 is thereby communicated to the heat exchanger 110 through the inlet passage 150. As the exhaust outlet 138 is located axially downstream of the throat region 156, a venturi effect generates a differential pressure relative to the inlet scoop 148 to further facilitate evacuation of the bypass air "B" from the heat exchanger 110 and by way of the exhaust passage 152.

The heat exchanger 110, in one disclosed non-limiting embodiment, may be a circular, internally split manifold, with an internal, heat transferring, barrier 156 that separates the bypass air "B" from the diffuser case air 132 being cooled. Although not shown, both the bypass air and diffuser case air may be channeled within the heat exchanger 110 to maximize heat exchanger efficiency while supporting a cooled diffuser case air manifold 158 that distributes cooled air to each of a plurality of fuel injectors 86 of the fuel injector system 92 via respective and circumferentially spaced passages 124. The manifold 158 may be an integral, annular, part of the heat exchanger 110 or can be a separate component. The heat exchanger 110 and manifold 158 may, for example, be readily manufactured with an additive manufacturing process such as powder bed metallurgy, direct metal laser sintering, electron beam melting or other. Depending upon air flow demands, it is further understood that the heat exchanger 110 and manifold 158 maybe much larger than that illustrated in FIG. 7.

Now referring to FIG. 8, in some embodiments the combustor may include a second downstream fuel injection system 160 that communicates with the combustion chamber 66 downstream of the forward fuel injection system 92. The downstream fuel injection system 160 introduces a portion of the fuel required for desired combustion performance, e.g., emissions, operability, durability as well as to lean-out the fuel contribution provided by the multiple of axial fuel nozzles 86 generally within the forward fuel injection system.

The downstream fuel injection system 160 generally includes a radially outer fuel injection manifold 162 located in the outer annular plenum 76 and/or a radially inner fuel injection manifold 164 located in the inner annular plenum 78. It should be appreciated that the downstream fuel injection system 160 may include only the radially outer fuel injection manifold 162; only the radially inner fuel injection manifold 164, or both (shown).

The radially outer fuel injection manifold 162 may be mounted to the diffuser outer case 65. Alternatively, the radially outer fuel injection manifold 162 may be mounted to the combustor support shell 68. The radially inner fuel injection manifold 164 may be mounted to the diffuser inner case 67 or combustor support shell 70. It should be appreciated that various mount arrangements may alternatively or additionally provided such as location of the outer fuel injection manifold 162 mounted inside or outside the diffuser case module 64. The radially inner and outer fuel injection manifolds 162, 164 are not limited to any particular configuration.

The radially outer fuel injection manifold 162 includes a multiple of radially extending supply lines 166A, each of which terminates in an outer fuel nozzle assembly 168A that projects predominantly radially toward a centerline "F" of the combustor chamber 66. The multiple of radially extending supply lines 166A may include, for example, compliant fuel lines or pigtails that accommodate relative growth and part movement. In one disclosed non-limiting embodiment, each outer fuel nozzle assembly 168A includes a fuel injector port 170A encased by an air swirler 172A that promotes mixing of the fuel spray with air to facilitate generation of the fuel-air distribution required for combustion.

The radially inner fuel injection manifold 164 likewise includes a multiple of radially extending supply lines 166B, each of which terminates in an inner fuel nozzle assembly 168B that project predominantly radially toward the centerline "F" of the combustor chamber 66. The multiple of radially extending supply lines 166B may include, for example, compliant fuel lines or pigtails that accommodate relative growth and part movement. In one disclosed non-limiting embodiment, each inner fuel nozzle assembly 168B includes a fuel injector port 170B encased by an air swirler 172B that promotes mixing of the fuel spray with air to facilitate generation of the fuel-air distribution required for combustion.

The radially inner fuel injection manifold 164 includes a main supply line 174 which may be arranged to pass through the relatively cooler forward assembly 80 to provide communication with the multiple of radially extending supply lines 166B. Alternatively, the main supply line 174 may pass through a downstream vane; e.g., a nozzle guide vane. It should be appreciated that the main supply line 174 may be a secondary or intermediary fuel line to, for example, facilitate assembly.

Given operational temperatures from the HPC 52 (see FIG. 1), the radially outer fuel injection manifold 162 and the radially inner fuel injection manifold 164 may be subject to soaking temperatures that may promote coking. The radially outer fuel injection manifold 162 and the radially inner fuel injection manifold 164 and other associated lines may be configured with a protective, low-conductivity sheath, a coating, a cooled tube-in-tube construction, be relatively oversized compared to fuel flow or other insulation that provides thermal resistance between the relatively hot air temperatures in the diffuser case module 64 and the relatively cold fuel temperatures in the fuel lines, manifolds and nozzles. Alternatively, or in addition, the downstream second fuel injection system 160 may communicate through or with the bypass stream of the engine and may include a thermal management or heat exchange system to further maintain low fuel temperatures.

The outer and inner fuel nozzle assemblies 168A, 168B may project through openings in the combustor 56 to supply fuel to the combustor between the bulkhead assembly 84 and the flow exit of the combustor exit. In one disclosed non-limiting embodiment, the outer and inner fuel nozzle assemblies 168A, 168B project through openings in the combustor 56 located within the first two-thirds of the combustor chamber 66.

Spark energy may be provided to the combustor 56 through a frequency-pulsed igniter arrangement 176 (illustrated schematically) which provides a continuous spark or other ignition source. The frequency-pulsed igniter arrangement 176 may be located in conventional as well as other locations within the combustor 56.

The fuel required for combustion is, thus, provided by the both the axial fuel nozzles 86 and the fuel nozzles 168A, 168B associated with the radially outer fuel injection manifold 162 and the radially inner fuel injection manifold 164. The distributed fuel injection and fuel-air mixing provided thereby may be tailored to optimize emissions, e.g., NOx, COx, smoke, particulates, etc., as well as control of combustor thermals, durability, profile and pattern factors that impact the downstream turbine section.

Figure 9:
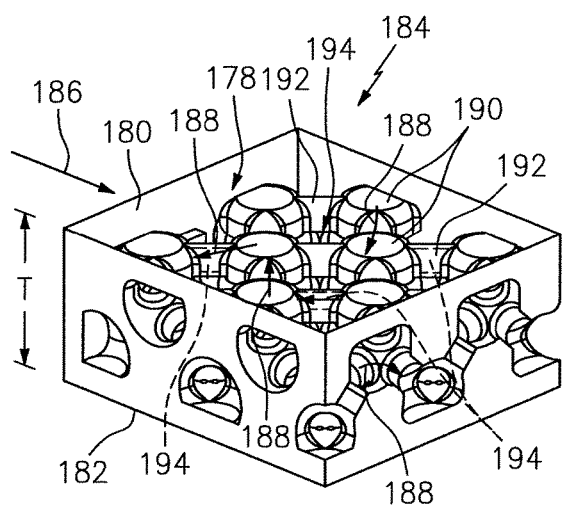
FIG. 9 is a diagrammatic perspective view of vascular engineered lattice (VESL) structure embodiment.
Figure 10:
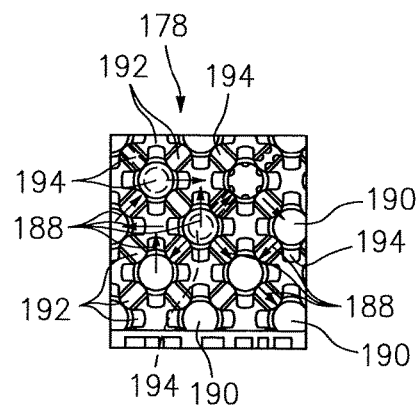
FIG. 10 is a diagrammatic planar view of the VESL structure shown in FIG. 9.

Now referring to FIGS. 9-15, in some embodiments, the present disclosure includes a fuel injection system 92, 160 that utilizes one or more components having one or more walls or other elements with a vascular engineered structure lattice (also referred to herein as a "VESL" structure). FIGS. 9 and 10 illustrate one exemplary VESL structure 178 that can be incorporated into a component. In this disclosure, the term "vascular engineered structure lattice" (or "VESL" structure) denotes a structure of known surface and flow areas that includes a specific structural integrity.

As discussed in greater detail below, the VESL structure 178 of FIGS. 9 and 10 is a hollow vascular structure. The hollow vascular structure shown in FIGS. 9 and 10 defines a solid material with discrete, interconnected cooling passages that are connected through common nodes to control airflow throughout the hollow vascular structure.

The specific design and configuration of the VESL structure 178 of FIG. 9 is not intended to limiting. It will be appreciated that because the VESL 178 is an engineered structure, the vascular arrangement of these structures can be tailored to the specific cooling and structural needs of any given gas turbine engine component. The VESL structure 178 can be tailored to match external heat load and local life requirements by changing the design and density of the VESL structure 178. The actual design of any given VESL structure 178 may depend on geometry requirements, pressure loss, local cooling flow, cooling air heat pickup, thermal efficiency, overall cooling effectiveness, aerodynamic mixing, and produceability considerations, among other gas turbine engine specific parameters. In one embodiment, the VESL structure 178 is sized based on a minimum size that can be effectively manufactured and that is not susceptible to becoming plugged by dirt or other debris.

The exemplary VESL structure 178 extends between a first wall 180 and a second wall 182 of a component 184. The first wall 180 is spaced from the second wall 182. The first wall 180 may be exposed to a gas path 186 (the specific gas path would depend upon the particular component), whereas the second wall 182 may be remotely positioned from the gas path 186. The VESL structure 178 includes a thickness T between the first wall 180 and the second wall 182. The thickness T can be of any dimension. The terms "first wall 180" and "second wall 182" as used herein may, along with the VESL structure, collectively form a single wall within a component.

Airflow 188 filters through the VESL structure 178 to convectively cool the component 184. In this embodiment, the VESL structure 178 embodies a hollow configuration in which the airflow 188 may be circulated inside of the various passages defined by the VESL structure 178. For example, the hollow configuration of the VESL structure 178 may establish a porous flow area for the circulation of airflow 188. Additionally, airflow 188 could be communicated over and around the VESL structure 178 within voids disposed between the walls 180, 182 of the component 184.

The VESL structure 178 can be manufactured by using a variety of manufacturing techniques. For example, the VESL structure 178 may be created using an additive manufacturing process such as direct metal laser sintering (DMLS). Another additive manufacturing process that can be used to manufacture the VESL structure 178 is electron beam melting (EBM). In another embodiment, select laser sintering (SLS) or select laser melting (SLM) processes may be utilized.

In yet another embodiment, a casting process can be used to create the VESL structure 178. For example, an additive manufacturing process can be used to produce a molybdenum core (RMC) that can be used to cast the VESL structure 178. In one embodiment, the additive manufacturing process includes utilizing a powder bed technology and the casting process includes a lost wax process.

The exemplary VESL structure 178 includes a plurality of nodes 190, a plurality of branches 192 that extend between the nodes 190, and a plurality of hollow passages 194 between the branches 192 and the nodes 190. The number, size and distribution of nodes 190, branches 192 and hollow passages 194 can vary from the specific configuration shown. In other words, the configuration illustrated by FIG. 4 is but one possible design.

The branches 192 may extend orthogonally or non-orthogonally to the nodes 190. The nodes 190 and branches 192 can be manufactured as a single contiguous structure made of the same material. In one embodiment, the nodes 190 and branches 192 are uniformly distributed throughout the VESL structure 178. In another embodiment, the nodes 190 and branches 192 are non-uniformly distributed throughout the VESL structure 178.

In this "hollow lattice" structure configuration, airflow 188 can be circulated inside hollow passages 194 of the nodes 190 and the branches 192 to cool the component 184 in the space between the walls 180, 182 (see FIG. 9). For example, the "hollow" lattice structure may include multiple continuous hollow spoke cavity passages 194 thru which airflow 188 is passed. The airflow 188 flows from each of the hollow branches 192 and coalesces into the nodes 190, which serve as a plenum for the airflow 188 to be redistributed to the next set of hollow branches 192 and nodes 190. The "hollow" lattice structure forms multiple circuitous continuous passages in which the airflow 188 flows to maximize the internal convective cooling surface area and coolant mixing. Additionally, airflow 188 could be communicated over and around the nodes 190 and branches 192 of the VESL structure 178.

The nodes 190 and the branches 192 additionally act as structural members that can be tailored to "tune" steady and unsteady vibration responses in order to resist and optimally manage steady and unsteady pressure forces, centrifugal bending and curling stresses, as well as provide for improved local and section average creep and untwist characteristics and capability. In some embodiments, one or more of the nodes 190 and branches 192 may include augmentation features 196 (shown schematically in FIG. 10) that augment the heat transfer effect of the airflow 188 as it is communicated through the VESL structure 178. The augmentation features 196 can also be made using the additive manufacturing processes describe above.

As mentioned above, the vascular arrangement of the VESL structure 178 can be tailored to the specific cooling and structural needs of any given gas turbine engine component. For example, a first portion of the VESL structure 178 can include a different combination of nodes 190, braches 192 and hollow passages 194 compared to a second portion of the VESL structure 178. In one embodiment, a first portion of the VESL structure 178 may include a greater amount of cooling area whereas a second portion of the VESL structure 178 may provide a greater amount of structural area.

Figure 11:
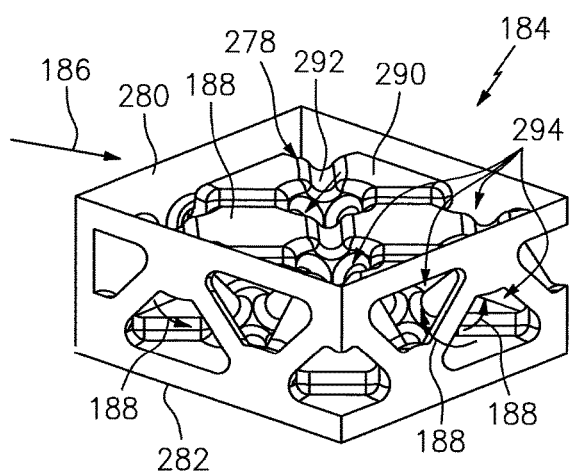
FIG. 11 is a diagrammatic perspective view of a VESL structure embodiment.
Figure 12:
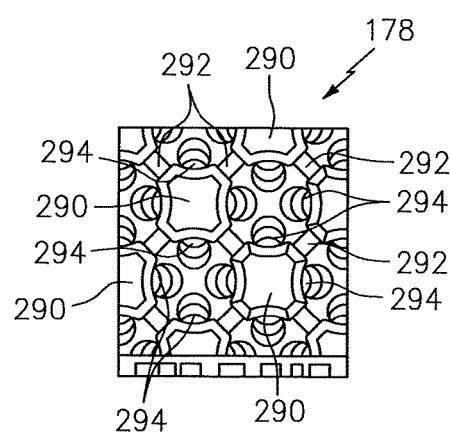
FIG. 12 is a diagrammatic planar view of the VESL structure shown in FIG. 10.

FIGS. 11 and 12 illustrate another exemplary VESL structure 278. In this embodiment, the VESL structure 278 embodies a solid lattice structure in which airflow is communicated over and around the solid lattice structure thereby governing flow and providing structural support. The VESL structure 278 is disposed between a first wall 280 and a second wall 282 of the component 184.

The VESL structure 278 includes a plurality of nodes 290, a plurality of branches 292 that extend between the nodes 290, and a plurality of open passages 294 between the branches 292 and the nodes 290. The nodes 290, branches 292 and open passages 294 can be manufactured as a single contiguous structure made of the same material.

In this "solid" lattice structure configuration, airflow 188 can be circulated through the open passages 294 to cool the component 184 in the space between the walls 280, 282. In other words, in contrast to the hollow lattice structure embodiment which communicates airflow through the insides of the nodes 290 and branches 292, the airflow 188 is circulated over and around these parts as part of a porous flow area. For example, the "solid" lattice structure includes multiple continuous solid branches 292 over which airflow 188 is passed. The "solid" lattice structure forms circuitous passages for the airflow 188 to traverse around as it migrates through the VESL structure 278 to maximize the convective cooling surface area and coolant mixing around the nodes 290 and the branches 292. The nodes 290 and the branches 292 additionally act as structural members that resist pressure, rotation forces, and loads.

The exemplary VESL structure 278 establishes a ratio of cooling area to structural area. The cooling area is established by the open passages 294, while the nodes 290 and branches 292 determine the amount of structural area. In one embodiment, the amount of cooling area exceeds the structural area (cooling area>structural area). In another embodiment, a ratio of the cooling area to the structural area is less than 1 (cooling area<structural area). In yet another embodiment, a ratio of the cooling area to the structural area is between 1 and 4. Other configurations are also contemplated.

Figure 13:
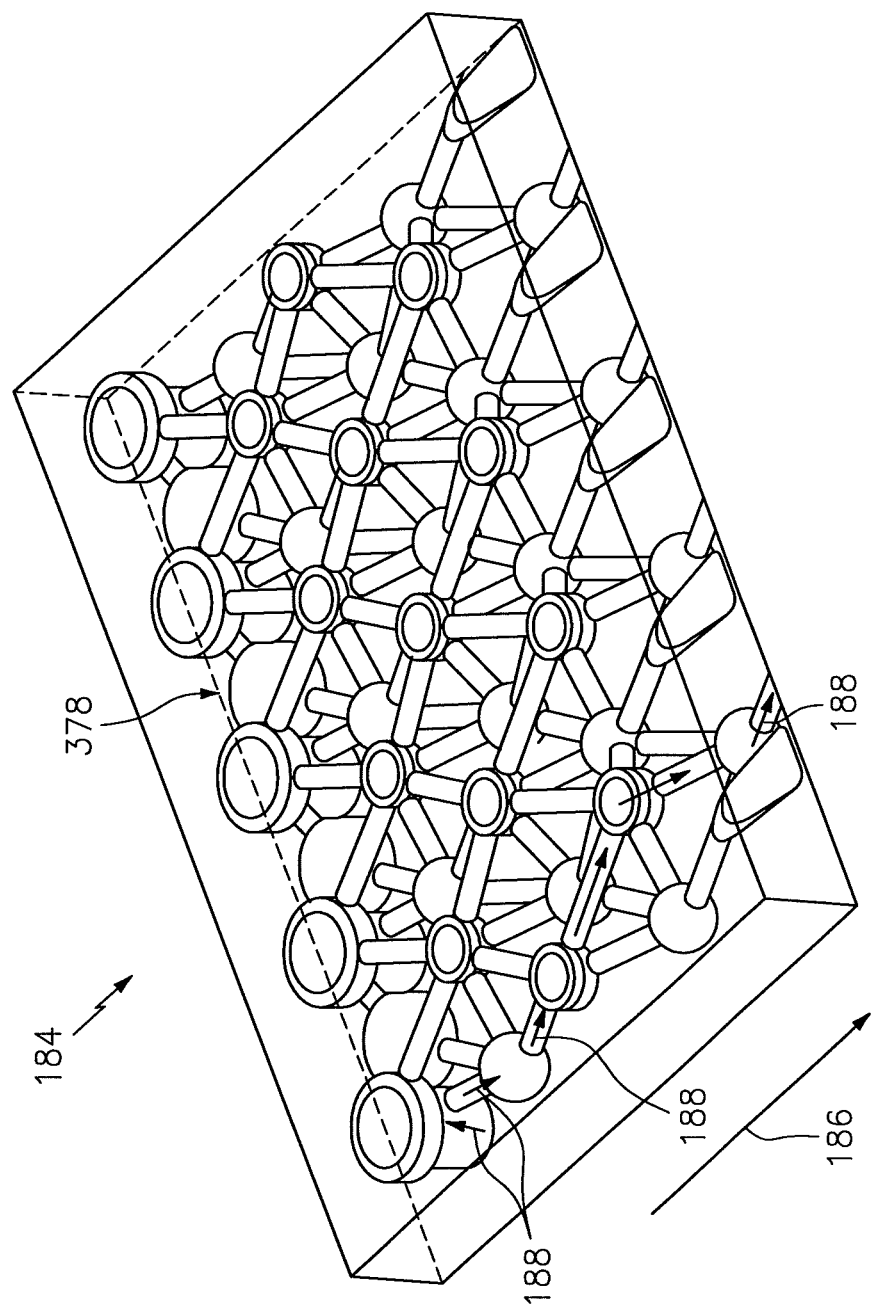
FIG. 13 is a diagrammatic perspective view of a VESL structure embodiment, illustrating a co-flow configuration.
Figure 14:
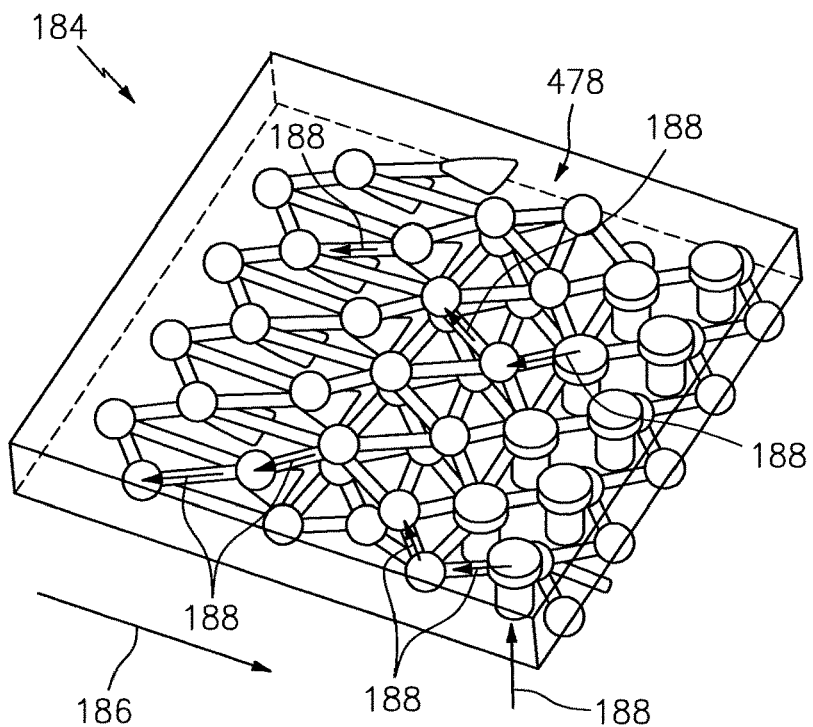
FIG. 14 is a diagrammatic perspective view of a VESL structure embodiment, illustrating a counterflow configuration.

The VESL structures can be configured in either a co-flow or counter-flow heat exchanger design concepts. For example, FIG. 13 depicts a VESL structure 378 providing a co-flow design. In other words, the airflow 188 is circulated through the VESL structure 378 in substantially the same direction as the gas path 186 flow direction. Although a hollow configuration is depicted, a co-flow design could also be incorporated into a "solid" configuration. FIG. 14 illustrates yet another exemplary VESL structure 478 that could be incorporated into a gas turbine engine component. In this embodiment, the VESL structure 478 provides a counter-flow design. In other words, the airflow 188 is circulated through the VESL structure 478 in a direction that is generally opposite to the flow direction of the gas path 186.

Figure 15:
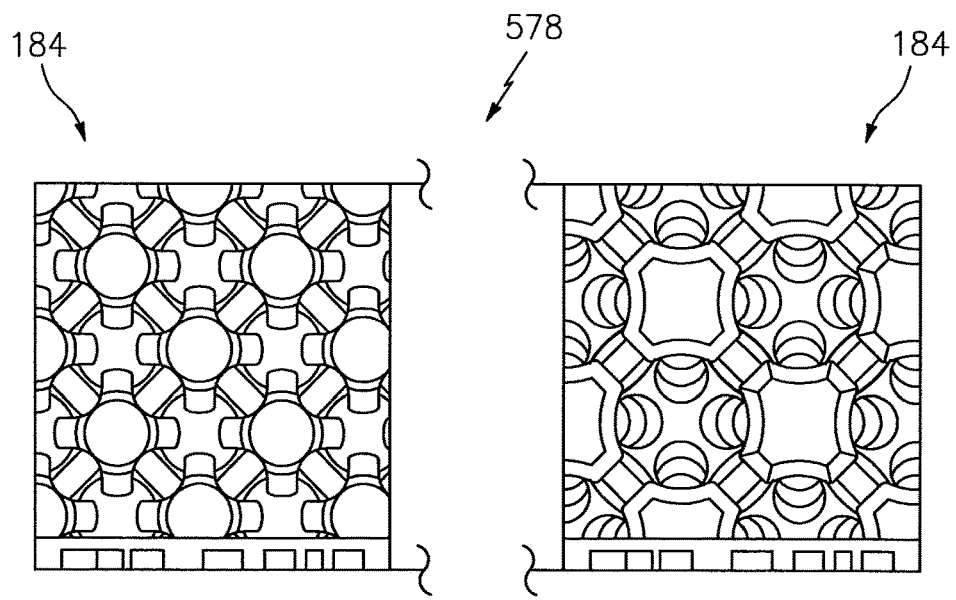
FIG. 15 is a diagrammatic planar view of portions of a VESL structure embodiment.

FIG. 15 illustrates yet another exemplary VESL structure 578 that could be incorporated into a gas turbine engine component. In this embodiment, the VESL structure 578 includes a first portion 578A that can include a hollow lattice structure and a second portion 578B that can include a solid lattice structure. The distribution of interchangeability of the hollow and solid lattice structures is dependent on design requirements and other considerations.

The exemplary VESL structures described in this disclosure may be incorporated into any relatively high heat load gas turbine engine applications where convective cooling is desired. Among other possible design configurations, the VESL structures of this disclosure may be implemented as a co-flow or counter-flow configurations to more efficiently provide localized convective cooling to achieve extended component operating life.

As indicated above, according to the present disclosure a fuel injection system for a gas turbine engine may include one or more components (e.g., a wall or other structure within a component, or the component itself) with a VESL structure. The above Detailed Description describes two examples of fuel injection systems for a gas turbine engine that may include an element with a VESL structure. The present disclosure is not limited to these exemplary fuel injections systems.

According to the present disclosure, the VESL structure may be a single fluid flow structure or may be a two fluid flow structure. For example, the VESL, structure 178 described and shown in FIGS. 9 and 10 may be utilized as a single fluid flow structure wherein a single fluid flow is passed through the hollow passages 194 within the nodes 190 and the branches 192. Alternatively, the VESL structure 178 described and shown in FIGS. 9 and 10 may be utilized as a single fluid flow structure wherein a single fluid flow is passed around the nodes 190 and the branches 192. The VESL, structure 278 described and shown in FIGS. 11 and 12 can also be utilized as a single fluid flow structure wherein a single fluid flow is passed around the solid nodes 190 and branches 192 of the VESL structure 278. The VEST, structure 178 described and shown in FIGS. 9 and 10 may also be utilized as a two fluid flow structure wherein a first fluid flow is passed through the hollow passages 194 within the nodes 190 and the branches 192, and a second fluid flow is passed around the nodes 190 and the branches 192. Also as indicated above, the direction of the fluid flow (i.e., co-flow, counterflow) through the VESL structure can be selected to suit the cooling requirements of the component in which the VESL structure is disposed.

Any fluid presented at a pressure high enough to be passed through the VESL structure and at a low enough temperature, relatively speaking, to provide the desired cooling can be used within the VESL structure(s). Examples of fluid that can be used as cooling mediums include compressor bleed air, for example, cooled within a heat exchanger 110 as described above; e.g., described above as cooled diffuser case air 132. In some applications, it may be desirable to increase the pressure of the cooling medium relative to its pressure at the source; e.g., if the cooling medium includes air bled from a compressor stage, it may be desirable to increase the pressure of the bled air prior to introducing it as a cooling medium. Non-limiting examples of methodologies and apparatus for increasing the pressure of the cooling medium include using a blower, a compressor, or the like (which devices may be referred to as "pressure boosters") to increase the pressure of the cooling medium; e.g., an auxiliary compressor disposed in fluid communication with the engine compressor (or fan section) bled air and the VESL structure, where the bled air is received by the auxiliary compressor at P1 and exits the auxiliary compressor at P2 (where P2 is greater than P1), subsequently passing to the VESL structure. Another fluid that can be used as a cooling medium is fuel that is intended to be combusted within the gas turbine engine. The present disclosure is not limited to using these exemplary cooling mediums. As another example, in some instances a cooling medium dedicated to cooling the VESL structure could be used.

To illustrate the utility of the present disclosure, non-limiting examples of components within the described fuel injection systems will now be provided. In terms of the first forward fuel injection system 92, the fuel conduit 102 is disposed within a sleeve 112 (e.g., see FIGS. 4-6). In the operation of the gas turbine engine, the exterior of the sleeve 112 is subjected to high temperature gas exiting the HPC 52. Some, or all, of the sleeve 112 may include one or more VESL structures 178 to provide a lower temperature environment around the fuel conduit 102 and fuel nozzle 106, and thereby inhibit coke formation within the fuel conduit 102 and/or nozzle 106. As another example, the fuel conduit 102 itself may incorporate one or more VESL structures. In this embodiment, the fuel passing through the conduit may act as a coolant as it passes through the conduit 102, and then such fuel may be passed through the nozzle 106 and used for combustion within the combustor 56. As indicated above, such VESL structures may utilize cooling mediums such as, but not limited to, the cooled diffuser case air 132 or fuel.

In terms of the second downstream fuel injection system 160, as indicated above downstream fuel injection system 160 may include a radially outer fuel injection manifold 162 and/or a radially inner fuel injection manifold 164. In both instances, the fuel injection manifolds 162, 164 include a multiple of radially extending supply lines 166A, 166B, each of which terminates in a fuel nozzle assembly 168A, 168B that projects predominantly radially toward a centerline "F" of the combustor chamber 66. Also in both instances, each fuel nozzle assembly 168A, 168B includes a fuel injector port 170A encased by an air swirler 172A. In this exemplary fuel injection system, the core gas passing through the combustor 56 proximate the fuel nozzle assemblies 168A, 168B will likely be at a substantially higher temperature than is present immediately proximate the nozzle 106 of the forward fuel injection system. The VESL structures according to the present disclosure can provide requisite cooling to inhibit coke formation within the supply lines 166A, 166B and fuel nozzle assemblies 168A, 168B. For example, VESL structures could be used to surround portions of the fuel injection manifolds 162, 164 and/or could be used in the wall structures of the fuel injection manifolds. Similarly, VESL structures may be used to surround portions of the fuel supply lines 166a, 166B, and/or could be used in the wall structures of the fuel supply lines 166A, 166B, and/or could be used as the supply lines 166A, 166B themselves. In the latter instance, the fuel passing through the supply lines 166A, 166B may act as a coolant as it passes through the supply lines 166A, 166B, and then such fuel may be passed through the respective fuel injector ports 170A, 170B and used for combustion within the combustor 56.

In instances where fuel is used as a cooling medium within a VESL structure, that fuel may not be passed into the combustor immediately for combustion. In some instances, the fuel may be returned to the fuel source.

In instances where cooled compressor bleed air (e.g., cooled diffuser case air 132) is used as a cooling medium within a VESL structure, that cooling air may be passed into the combustor where it can then be utilized within the combustion process.

It should be understood that relative positional terms such as "forward", "aft", "upper", "lower", "above", "below", and the like are with reference to the normal operational attitude and should not be considered otherwise limiting.

It should be understood that like reference numerals identity corresponding or similar elements throughout the several drawings. It should also be understood that although a particular component arrangement is disclosed in the illustrated embodiment, other arrangements will benefit here from.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A cooled fuel injector system of a combustor section of a gas turbine engine, at least a part of the fuel injector system is exposed to core gas flow traveling through the engine, the cooled fuel injector system comprising:
   a source of a first cooling fluid, wherein the first cooling fluid is at a temperature lower than a temperature of the core gas flow proximate the fuel injector system; and
   a fuel injector system component that includes a vascular engineered structure lattice (VESL) structure disposed between walls of the fuel injector system component, wherein the VESL structure is in fluid communication with the source of the first cooling fluid, wherein the VESL structure includes:
a plurality of nodes, each node of the plurality of nodes comprising a node structure defining a hollow enclosure; and
a plurality of branches, each branch of the plurality of branches defining a hollow passage extending through the branch,
wherein only a single branch of the plurality of branches extends between and connects adjacent nodes of the plurality of nodes,
wherein the hollow enclosures and hollow passages of the respective plurality of nodes and plurality of branches define a first cooling flowpath through the fuel injector system component, and
wherein a space between the walls of the fuel injector system component and exterior surfaces of the plurality of nodes and the plurality of branches defines a second cooling flowpath through the fuel injector system component separate from the first cooling flowpath.

2. The cooled injector system of claim 1, wherein the first cooling fluid includes hydrocarbon fuel of the same type injected into a combustion chamber of the combustor section through the fuel injector system, and wherein the fuel injector system is configured to pass the hydrocarbon fuel first cooling fluid into the combustion chamber after the first cooling fluid has passed through the VESL structure.

3. The cooled injector system of claim 1, wherein the first cooling fluid through the fuel injector system component.

4. The cooled injector system of claim 1, wherein first cooling flowpath is configured to convey the first cooling fluid through the fuel injector system component.

5. The cooled injector system of claim 4, wherein the system further includes a source of a second cooling fluid, wherein the second cooling fluid is at a temperature lower than the temperature of the core gas flow proximate the fuel injector system; and wherein the second cooling flowpath is configured to convey the second cooling fluid through the fuel injector system component.

6. The cooled injector system of claim 5, wherein the second cooling fluid is a cooled compressor bleed air.

7. The cooled injector system of claim 1, wherein the VESL structure is disposed in a portion of the fuel injector system component that is exposed to the core gas flow during operation of the gas turbine engine.

8. A combustor section of a gas turbine engine, wherein the engine has a core gas flow traveling axially through the engine, the combustor section comprising:
a forward fuel injector system; and
a downstream fuel injector system, including at least one component that includes a vascular engineered structure lattice (VESL) structure disposed between walls of the at least one component, wherein the VESL structure is in fluid communication with a source of a first cooling fluid;
wherein the source of the first cooling fluid selectively provides the first cooling fluid to the at least one component at a temperature lower than a temperature of the core gas flow proximate the at least one component of the downstream fuel injector system, wherein the VESL structure includes:
a plurality of nodes, each node of the plurality of nodes comprising a node structure defining a hollow enclosure; and
a plurality of branches, each branch of the plurality of branches defining a hollow passage,
wherein only a single branch of the plurality of branches extends between and connects adjacent nodes of the plurality of nodes,
wherein the hollow enclosures and hollow passages of the respective plurality of nodes and plurality of branches define a first cooling flowpath through the at least one component, and
wherein a space between the walls of the at least one component and exterior surfaces of the plurality of nodes and the plurality of branches defines a second cooling flowpath through the at least one component separate from the first cooling flowpath.

9. A gas turbine engine, wherein the engine has a core gas flow traveling axially through the engine, comprising:
a compressor;
a combustor section in communication with the compressor, the combustor section having a forward fuel injector system, a downstream fuel injector system, and a combustion chamber, wherein both the forward and downstream fuel injection systems are in communication with the combustion chamber, and wherein the downstream fuel injector system includes at least one component having a vascular engineered structure lattice (VESL) structure disposed between walls of the at least one component, wherein the VESL structure is in fluid communication with a source of a first cooling fluid, and wherein the source of the first cooling fluid selectively provides the first cooling fluid to the at least one component at a temperature lower than a temperature of the core gas flow proximate the at least one component of the downstream fuel injector system; and
a turbine section in communication with the combustor section,
wherein the VESL structure includes:
a plurality of nodes, each node of the plurality of nodes comprising a node structure defining a hollow enclosure; and
a plurality of branches, each branch of the plurality of branches defining a hollow passage,
wherein only a single branch of the plurality of branches extends between and connects adjacent nodes of the plurality of nodes,
wherein the hollow enclosures and hollow passages of the respective plurality of nodes and plurality of branches define a first cooling flowpath through the at least one component, and
wherein a space between the walls of the at least one component and exterior surfaces of the plurality of nodes and the plurality of branches defines a second cooling flowpath through the at least one component separate from the first cooling flowpath.

10. A method of cooling a combustor section of a gas turbine engine, wherein the engine has a core gas flow traveling axially through the engine, the method comprising the steps of:
providing a combustor section having a forward fuel injector system, a downstream fuel injector system, and a combustion chamber with which both the forward and downstream fuel injection systems are in communication;
providing at least one vascular engineered structure lattice (VESL) structure disposed between walls of at least one component in the downstream fuel injector system;
providing fluid communication between the at least one VESL structure and a source of a first cooling fluid, wherein the first cooling fluid is at a temperature lower than a temperature of the core gas flow proximate the at least one component of the downstream fuel injector system; selectively passing the first cooling fluid through the at least one VESL structure within the at least one component, wherein the at least one VESL structure includes:
a plurality of nodes, each node of the plurality of nodes comprising a node structure defining a hollow enclosure; and
a plurality of branches, each branch of the plurality of branches defining a hollow passage,
wherein only a single branch of the plurality of branches extends between and connects adjacent nodes of the plurality of nodes,
wherein the hollow enclosures and hollow passages of the respective plurality of nodes and plurality of branches define a first cooling flowpath through the at least one component, and
wherein a space between the walls of the at least one component and exterior surfaces of the plurality of nodes and the plurality of branches defines a second cooling flowpath through the at least one component separate from the first cooling flowpath.

11. The method of claim 10, wherein the step of selectively passing the first cooling fluid includes passing the first cooling fluid through the first cooling flowpath.

12. The method of claim 11, further comprising the step of providing a source of a second cooling fluid, wherein the second cooling fluid is at a temperature lower than the temperature of the core gas flow proximate the downstream fuel injector system; and further comprising the step of selectively passing the second cooling fluid through the second cooling flowpath.

13. The cooled injector system of claim 1, wherein the source of the first cooling fluid includes an outlet of a heat exchanger, and wherein an inlet of the heat exchanger receives diffuser case air.

14. The combustor section of claim 8, wherein the source of the first cooling fluid includes an outlet of a heat exchanger, and wherein an inlet of the heat exchanger receives diffuser case air.

15. The gas turbine engine of claim 9, wherein the source of the first cooling fluid includes an outlet of a heat exchanger, and wherein an inlet of the heat exchanger receives diffuser case air.

16. The method of claim 10, wherein the source of the first cooling fluid includes an outlet of a heat exchanger, and wherein an inlet of the heat exchanger receives diffuser case air.

17. The cooled injector system of claim 1, wherein at least one of the plurality of nodes and the plurality of branches comprises at least one augmentation feature protruding from an interior surface of the at least one of the plurality of nodes and the plurality of branches.

18. The cooled injector system of claim 1, wherein each node of the plurality of nodes is connected to at least three other nodes of the plurality of nodes.

* * * * *

UNITED STATES PATENT AND TRADEMARK OFFICE
CERTIFICATE OF CORRECTION

PATENT NO. : 10,400,674 B2
APPLICATION NO. : 14/707790
DATED : September 3, 2019
INVENTOR(S) : JinQuan Xu Page 1 of 1

It is certified that error appears in the above-identified patent and that said Letters Patent is hereby corrected as shown below:

In the Specification

Column 14, Line 64, please delete "VEST" and insert --VESL--.

In the Claims

Column 17, Line 28, Claim 3, after "wherein the" please insert --second cooling flowpath is configured to convey the--.

Column 17, Line 30, Claim 4, after "wherein" please insert --the--.

Signed and Sealed this
Twenty-second Day of October, 2019

Andrei Iancu
*Director of the United States Patent and Trademark Office*